April 3, 1928. 1,664,474
D. R. BAILEY
SALTING APPARATUS
Filed Sept. 27, 1924 2 Sheets-Sheet 2

INVENTOR
David R. Bailey
BY
Harry F. Totten
ATTORNEY

Patented Apr. 3, 1928.

1,664,474

UNITED STATES PATENT OFFICE.

DAVID R. BAILEY, OF SACRAMENTO, CALIFORNIA, ASSIGNOR TO CALIFORNIA ALMOND GROWERS EXCHANGE, OF SAN FRANCISCO, CALIFORNIA, A CORPORATION OF CALIFORNIA.

SALTING APPARATUS.

Application filed September 27, 1924. Serial No. 740,321.

The present invention relates to apparatus especially adapted for salting food products such as nuts, potato-chips, and the like.

The objects of the invention are to provide a continuously operating apparatus in which the salt is constantly fed and effectively and evenly distributed over the food product and in which the excess salt, over and above that which adheres to said food product, is recovered; to provide means for varying the rate of passage of the food product through the machine to increase or decrease the time during which it is exposed to the salt; and to provide means for protecting the supply of salt from the moisture given off by the food product, which may be, and usually is, in a steamed or heated condition.

Other objects and advantages will become apparent from the following specification, wherein is described an apparatus embodying the principles of the invention. It is to be understood, however, that, although the preferred embodiment of the invention herein described is particularly adapted for salting food products, it may be used with equal success for spreading of any comminuted material upon any other product capable of being handled by the apparatus. It is also to be understood that the form and construction of the apparatus herein illustrated and described may be varied, within the limits of the claims hereto appended, without departing from the spirit of the invention.

With this in view, a preferred embodiment of the invention will now be fully described with reference to the accompanying drawings, wherein.

Figure 1:
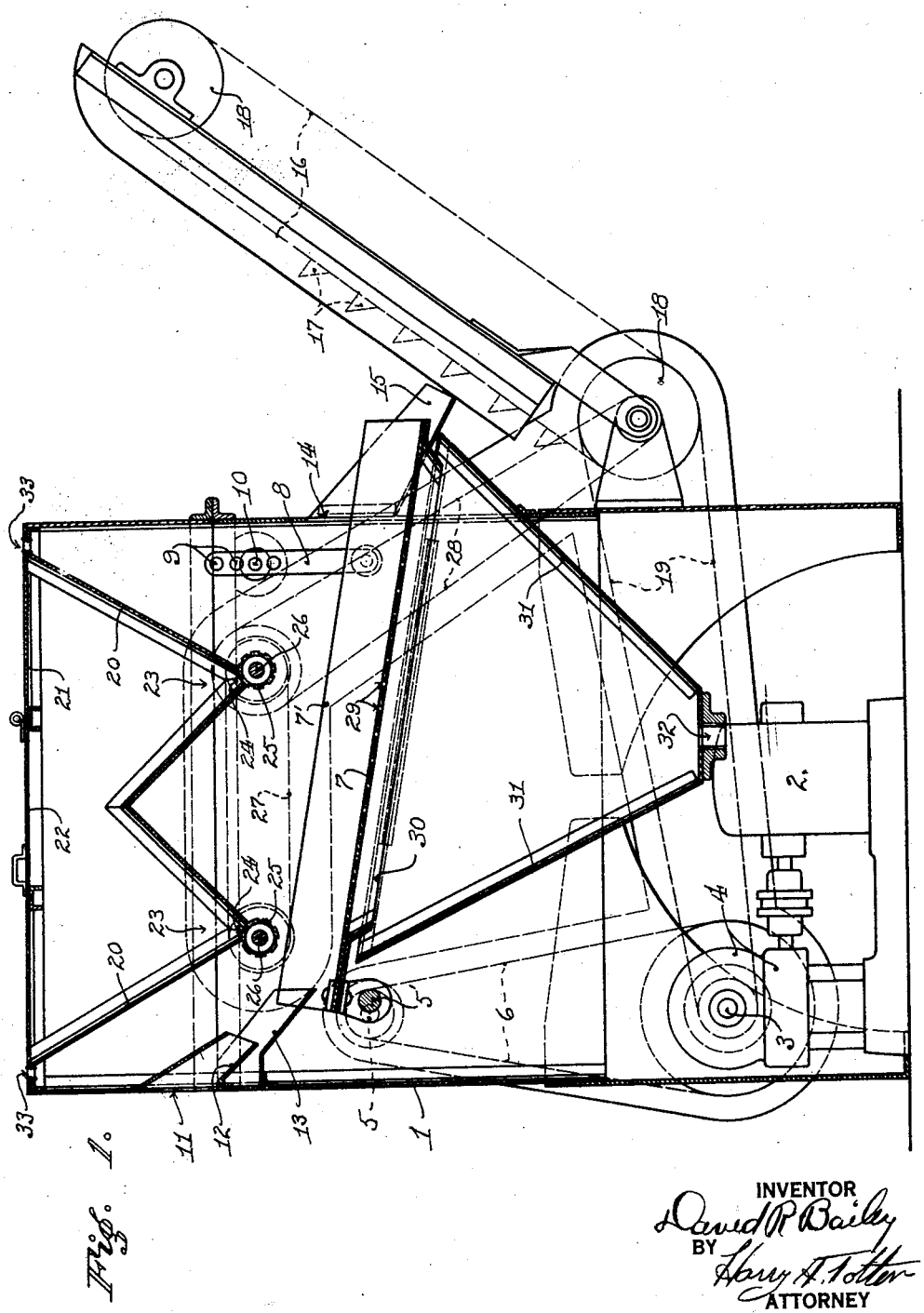
Fig. 1 is a vertical section of the apparatus.

In the drawings, the reference numeral 1 designates a supporting and enclosing casing, in the lower portion of which is a motor 2, Fig. 1, driving a shaft 3 through suitable gearing indicated at 4. A second horizontal shaft 5 is driven from the shaft 3 by suitable means, as for example, a chain indicated at 6. An inclined shaker tray 7 has its rear end journaled upon an offset or eccentric portion 5' of the shaft 5, from which it receives its shaking motion. The forward end portion of said shaker is suspended by means of links 8, said links being adjustable in effective length, as for example by having a plurality of holes 9 adapted for mounting upon fixed pivot pins 10, so that the inclination of the shaker 7 can be varied, to vary the rate at which the material passes over it.

Figure 2:
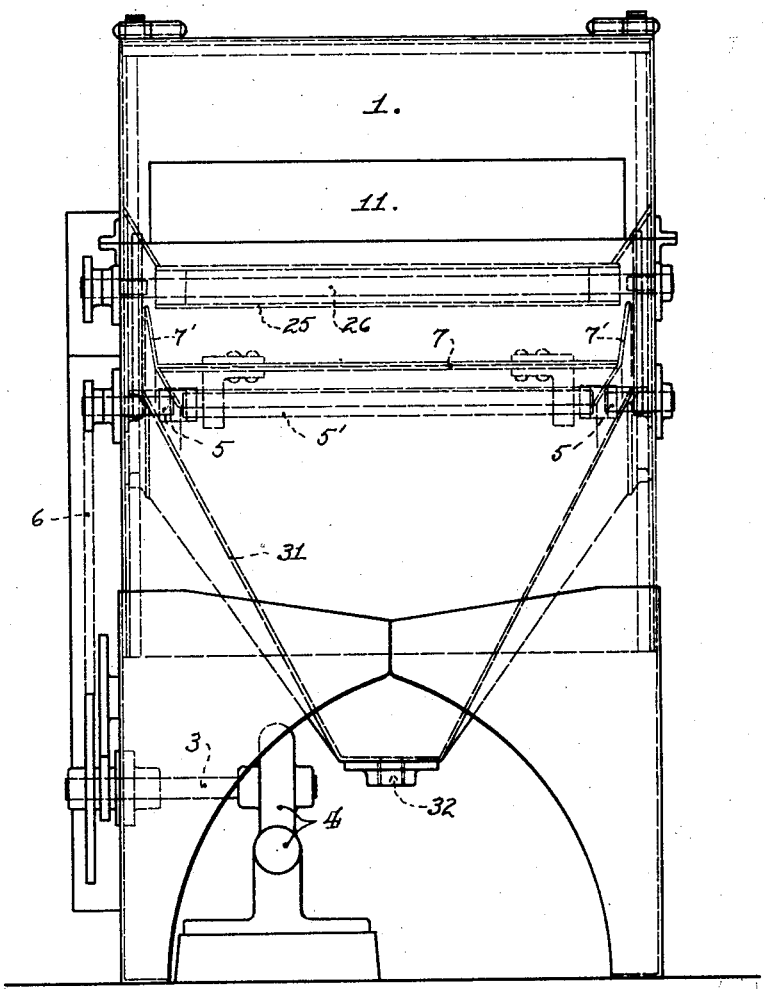
Fig. 2 is an end elevation as viewed from the left of Fig. 1.

The food product to be salted is introduced through a feed aperture 11, Figs. 1 and 2, in the rear wall of the casing 1, and is guided by successive troughs 12 and 13 respectively, Fig. 1, onto the shaker 7, over which it gradually advances. The forward end of said shaker projects through an aperture 14 in the front wall of the casing 1, and is positioned to dump the food product into a chute 15, by which it is fed to a discharge conveyor or elevator. Said elevator in its preferred form comprises an endless chain 16 having spaced buckets some of which are indicated at 17. Said chain 16 runs upon sprockets 18 and is driven by a chain 19 from the shaft 3.

In the upper portion of the casing 1 is a reservoir or hopper 20 adapted to contain a supply of salt, and provided with a tight cover 21 in which is a filling aperture closed by a hinged door 22. The bottom of said hopper 20 is divided into two spaced troughs 23, each with a transverse slit or opening 24 at its lowest point. Beneath each slit, and serving as a closure therefor, is a longitudinally corrugated feed roll 25, Figs. 1 and 2, carried by a horizontal shaft 26. Said shafts are connected by a chain indicated at 27, Fig. 1, and are driven by a chain 28 from the lower end of the discharge elevator. Therefore, the rotation of the rolls 25 causes the salt to be discharged, at a constant rate, from the hopper 20. Moreover, on account of such rotation of the rolls 25, which is fairly rapid, the salt is scattered and evenly spread over the food product as the latter passes over the shaker 7.

The shaker 7 is provided with sides 7' and with perforations 29 in its bottom, through which the excess salt, i. e. that which does not adhere to the food product, may fall. Guard rails or flanges 30 are secured to the under side of the shaker 7 around its perforated region, and serve to direct the excess salt into a fixed hopper 31 positioned beneath said shaker. An aperture 32 may be provided in the bottom of said hopper 31 through which the excess salt may be removed therefrom.

The food product entering the apparatus is usually in a steamed or moist condition, to cause a sufficient amount of salt to adhere thereto, and unless means were provided for guarding against it, the moisture given off by said food product, especially when warm, would be attracted by the fresh salt supply within the hopper 20, and would soon cause said salt to cake and render it impossible to feed. The rotating rolls 25, forming in effect oneway valves for the discharge of the salt from said hopper 20, effectively prevent the moisture from entering said hopper through its discharge slits 24, and the tight cover 21, with its closable door 22, protect said hopper from above. Vent apertures 3 may be provided in the top of the casing 1 to allow of the escape of the moisture laden air from within.

It is to be noted that the rate of discharge of the salt from the hopper 20 is positively controlled by the speed of rotation of the rolls 25, which is constant. The rate of travel of the food product over the shaker may be varied, however, by adjusting the inclination of said shaker as described above, so that by this means the length of time may be regulated during which the food product is subjected to the salting process.

I claim:

1. A salting apparatus comprising a reticulated salting tray receiving material to be salted at one end and fed by the motion of the tray to the opposite end, a salt hopper having a plurality of discharge outlets spaced apart for discharging salt onto the material fed over the tray at successive points, means for reciprocating the tray and means for discharging the salt from said outlets.

2. A salting apparatus comprising a reticulated salting tray operable to feed material to be salted from end to end thereof, means for supplying salt at a plurality of spaced points between the ends of said tray onto material fed thereover, salt receiving means below said tray for receiving the salt sifted through the tray, means carried by the tray for directing the salt into said receiving means, means for reciprocating the tray, and means for operating the salt supplying means.

3. A salting apparatus comprising a reticulated salting tray operable to feed material to be salted from end to end thereof, salt containing and feeding means operable to supply salt at a plurality of predetermined spaced points onto the material in its travel over the tray, means for simultaneously operating the salt feeding means and the tray, and means for varying the rate of feed between the material and the salt.

4. A salting apparatus comprising a reticulated salting tray operable to feed material to be salted from end to end thereof, salt containing and feeding means operable to supply salt transversely of the tray at a plurality of predetermined spaced points between the ends, a stationary salt receiving hopper below the tray, means for directing the salt discharged through the tray into said hopper, means for operating the tray and salt feeding means, and means for varying the feed of the material over the tray relative to the feed of salt.

In testimony whereof I have signed my name to this specification.

DAVID R. BAILEY.